US008626835B1

(12) United States Patent
Gyongyi et al.

(10) Patent No.: US 8,626,835 B1
(45) Date of Patent: Jan. 7, 2014

(54) SOCIAL IDENTITY CLUSTERING

(75) Inventors: Zoltan I. Gyongyi, Menlo Park, CA (US); Maureen Heymans, San Francisco, CA (US); Mikhail Lopyrev, San Francisco, CA (US); Hein Roehrig, San Francisco, CA (US)

(73) Assignee: Google Inc., Mountain View, CA (US)

( * ) Notice: Subject to any disclaimer, the term of this patent is extended or adjusted under 35 U.S.C. 154(b) by 505 days.

(21) Appl. No.: 12/909,822

(22) Filed: Oct. 21, 2010

(51) Int. Cl.
G06F 15/16 (2006.01)

(52) U.S. Cl.
USPC ............................. 709/204; 709/223; 709/225

(58) Field of Classification Search
USPC .................. 709/204, 223, 225; 707/1, 6, 102; 345/420, 440
See application file for complete search history.

(56) References Cited

U.S. PATENT DOCUMENTS

| 2004/0267686 | A1* | 12/2004 | Chayes et al. ..................... 707/1 |
| 2005/0171955 | A1 | 8/2005 | Hull et al. |
| 2006/0274062 | A1* | 12/2006 | Zhang et al. .................. 345/420 |
| 2007/0112761 | A1* | 5/2007 | Xu et al. ........................... 707/5 |
| 2008/0040475 | A1 | 2/2008 | Bosworth et al. |
| 2009/0319436 | A1 | 12/2009 | Andra et al. |
| 2010/0017431 | A1* | 1/2010 | Schmidt et al. ............... 707/102 |
| 2011/0137932 | A1 | 6/2011 | Wable |
| 2011/0196855 | A1 | 8/2011 | Wable et al. |
| 2012/0001919 | A1* | 1/2012 | Lumer ........................... 345/440 |

OTHER PUBLICATIONS

Page et al., "The PageRank Citation Ranking: Bringing Order to the Web". Technical Report, Stanford InfoLab, 1999.

* cited by examiner

Primary Examiner — Wing F Chan
Assistant Examiner — Benjamin M. Thieu
(74) Attorney, Agent, or Firm — Fish & Richardson P.C.

(57) ABSTRACT

Methods, systems, and apparatus, including computer programs encoded on computer storage media, for social identity clustering. In one aspect, a method includes receiving a connection graph representing public social data, where the nodes represent social identities and each edge is either a "me" edge between identities claimed to belong to the same person or a "friend" edge between identities claimed to belong to different identities. The method further includes converting the graph to a cluster graph in which each node initially corresponds to a single node of the connection graph. The method further includes updating the cluster graph by iteratively merging cluster nodes based on an analysis of the weight of the "me" edges connecting them, and then replacing the merged cluster nodes within the graph with a new cluster node containing the merged cluster nodes, where the edges of the new cluster node are the aggregated edges of the merged cluster nodes.

19 Claims, 4 Drawing Sheets

SOCIAL IDENTITY CLUSTERING

BACKGROUND

This specification relates to processing public social connection information.

With the proliferation of online social sites (web sites with social features), a typical user may maintain several user accounts across multiple social sites. Knowledge of a user's set of social identities (different identities used by the user on different social sites) is useful for improving the performance of applications that process and present information to users. Typically, an online social service determines additional identities of a user from information the user has provided explicitly, but a user may not provide a full list of all the user's alternate identities to any particular social service.

Many social web sites allow users to list their additional accounts and various social connections publicly, and the social web sites also annotate the users' public information with such user data using markup such as XHTML Friends Network (XFN) or Friend of a Friend Project (FOAF) markup. Such annotation makes it possible for social information to be collected from different social web sites by a web crawler. Since a large amount of such user data is publicly available, and public information is largely unverified, it is difficult to identify all of the social accounts belonging to one user from collected public social account information.

SUMMARY

This specification describes technologies relating to identification of social identities of an individual based on an analysis of collected public social information.

In general, one aspect of the subject matter described in this specification can be embodied in methods that include the actions of receiving a connection graph representing public social data that include identity data and social link data, where the connection graph is composed of nodes and directed edges connecting the nodes, where each node represents an identity extracted from the public social data and each edge represents a social link extracted from the public social data, and where each edge is either a "me" edge if the edge represents a "me" social link between identities asserted by the link author to belong to the same user, or a "friend" edge if the edge represents a "friend" social link between identities asserted by the link author to belong to different users; converting the connection graph to a cluster graph where a cluster initially corresponds to a single node of the connection graph and each edge of the cluster graph initially corresponds to a single edge of the connection graph; and clustering identities by iteratively grouping cluster nodes based on the weighting of "me" edges connecting the cluster nodes.

In embodiments, iteratively grouping cluster nodes includes the actions of identifying all outgoing "me" edges from a first cluster and all "me" edges to a second cluster, where each "me" edge has a respective weight; and, in response to determining that the weights of all "me" edges from the first cluster to the second cluster are more than a threshold fraction of the weights of all outgoing "me" edges from the first cluster, merging the first cluster and the second cluster to form a new cluster, and replacing the first and second cluster in the cluster graph with the new cluster, where the edges of the new cluster are aggregations of the edges of the former first cluster and the edges of the former second cluster, and where the new cluster represents the identities of the former first cluster and the identities of the former second cluster.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
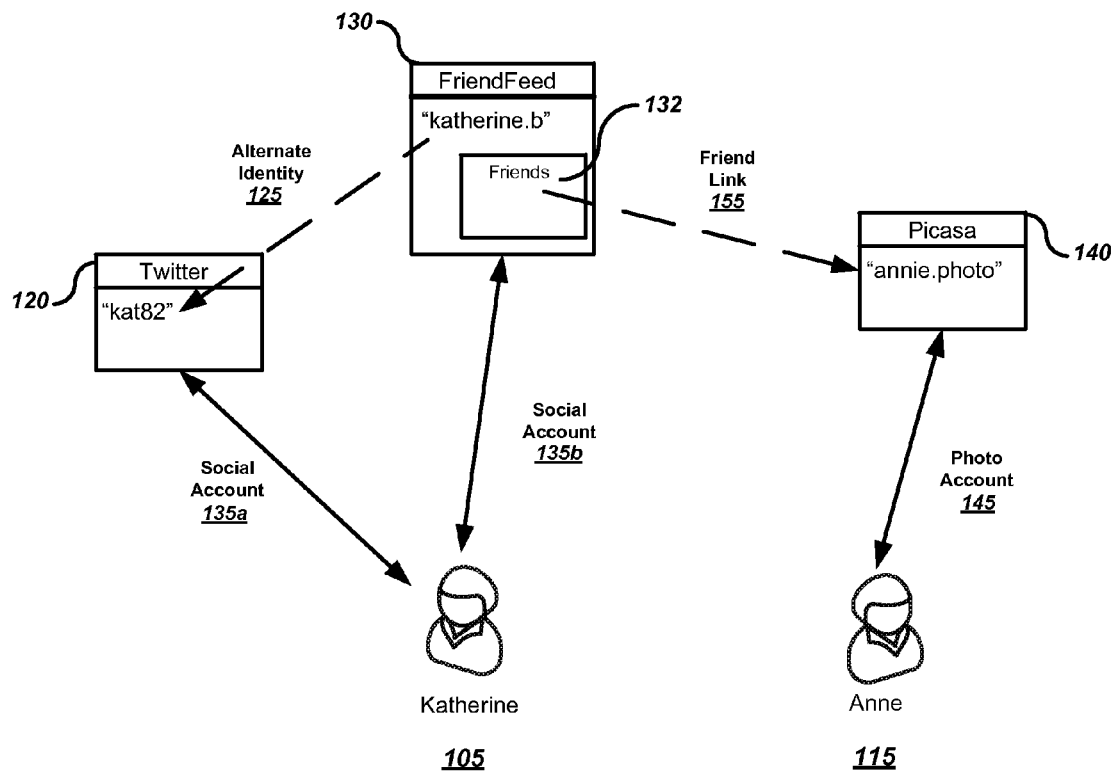
FIG. 1A is an illustration of an example scenario of the multiple public social web sites on which users maintain accounts.

FIG. 1A illustrates an example scenario of the multiple public social web sites on which two web users, Katherine 105 and Anne 115, maintain accounts. Katherine 105 has two social accounts: "kat82" 135a on twitter.com 120 and "katherine.b" 135b on friendfeed.com 130. Anne 115 has a photo account "annie.photo" 145 on Picasa 140. Katherine 105 decides to update her FriendFeed account profile. She provides her "kat82" 135a Twitter account as an alternate identity and adds Anne's "annie.photo" 145 Picasa account to her friends list 132. FriendFeed annotates profile pages with XFN markup with this user data, which allows web crawlers and search engines to extract Katherine's social account data from Katherine's FriendFeed profile page if she makes the page public.

Types of users' social data that may be discovered from markup on social web pages include user pages (120 130 and 140) as well as social connections (links) (125, 155) between the pages. Discovered social data may be expressed as a directed graph (connection graph) in which the user identities represented by the user pages are the nodes and the social links between pages are the edges.

Figure 1B:
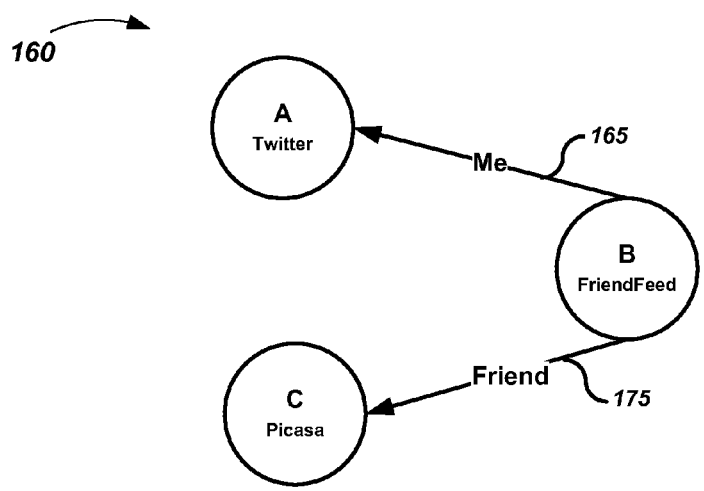
FIG. 1B is a graph of the discovered social data from the example scenario.

FIG. 1B depicts a connection graph 160 of Katherine's and Anne's public social data. The identities represented by nodes A, B, and C are as follows and can be named by uniform resource locators (URLs) of the form shown:

(A) http://twitter.com/kat82
(B) http://friendfeed.com/Katherine
(C) http://picasaweb.google.com/annie.photo.

The links 125 and 155 are the edges (B, me, A) 165 and (B, friend, C) 175. The edge (B, me, A) 165 is marked as a "me" edge—it is denoted "(A, me, B)"—and the edge (B, friend, C) 175 is marked as a "friend" edge based on the collected social data. A "me" link connects pages asserted to belong to the same user, while a "friend" link connects pages asserted to belong to different users.

An identity on a social site may be prepared by a multitude of web pages, each page having a different URL. The social site marks the pages as belonging to one social identity. A social site can assign a canonical name to a social identity (e.g., the URL of a main page or user profile page). A social connection graph 160 may be used to identify the social identities belonging to one individual. Identity clustering can be used to facilitate harnessing the social content associated with a person in order to improve web content processing applications such as presentation of relevant search results in response to a search query, grouping and presenting the online activity associated with a person, and discovering and recommending possible connections.

Figure 2:
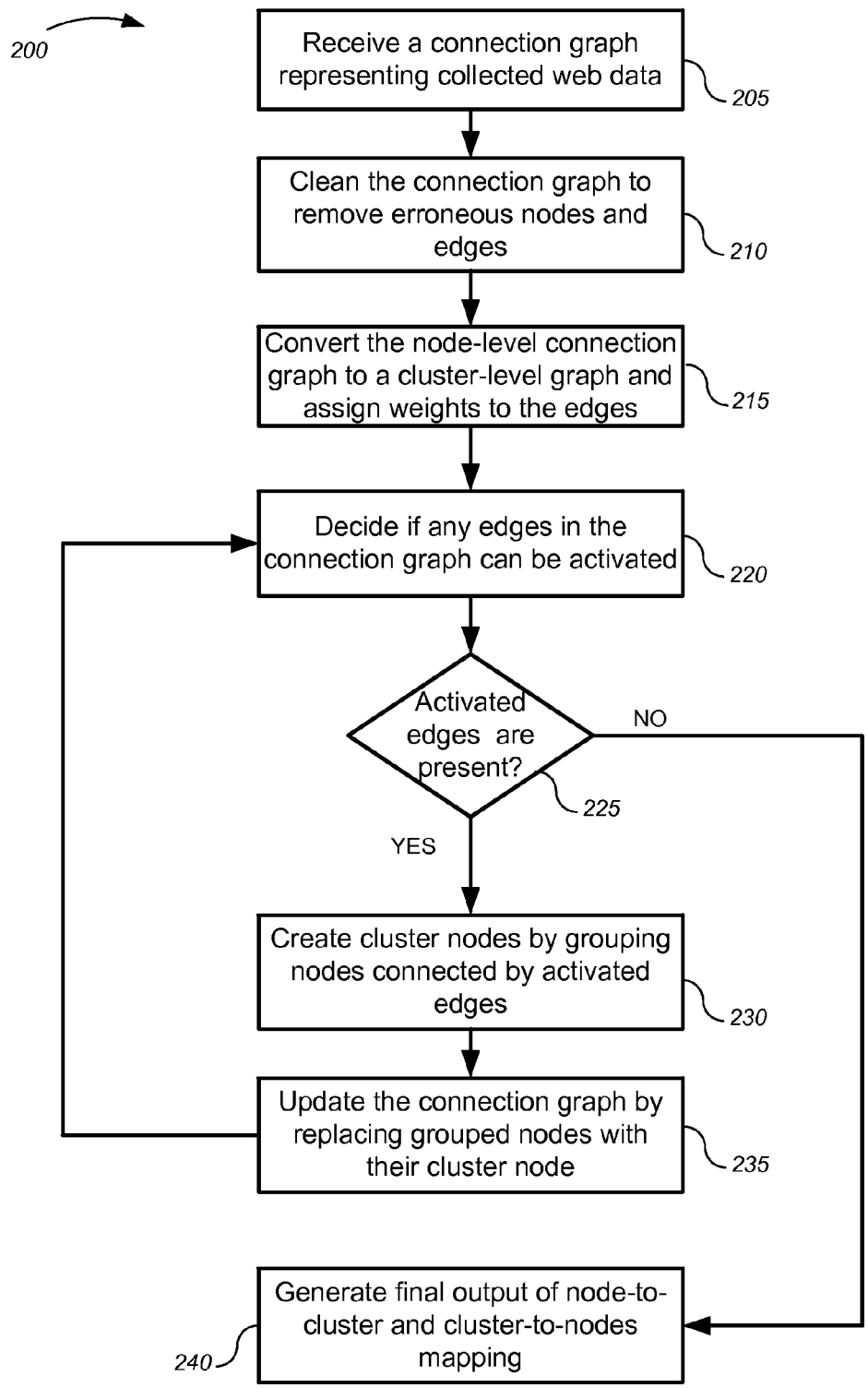
FIG. 2 is a flow diagram of an example method for performing identity clustering.

FIG. 2 is a flow diagram of an example method 200 for performing identity clustering on a social connection graph that is derived from collected, publicly available, user social data. For convenience, the method 200 will be described with respect to a system that includes one or more computing devices and performs the method 200.

The system receives 205 a connection graph representing social connection data that has been collected from users' public information (e.g., user information collected from social sites and public web pages). The system cleans 210 the graph in order to identify and remove erroneous nodes and edges. Since social sites do not necessarily check if an alternate identity is really controlled by the claimant, one type of error that may be detected is that a web page will claim a non-existent relationship with another web page.

One indicator that an actual "me" relationship exists between two identities is the presence of bidirectional (or reciprocal) "me" edges between the nodes representing the identities within a connection graph. Turning to the example of FIG. 1A, Katherine 105 may also decide to list her Friend-Feed profile page 130 as her homepage on Twitter 120. Since Twitter, like FriendFeed, automatically annotates pages with XFN, another connection (A, me, B) would be extracted by a web crawler and result in a bidirectional "me" connection between nodes A and B on the connection graph. Because some users may not be permitted to declare all of their alternate identities (e.g., a social site may only allow for a single homepage link on the user profile page), the presence of a bidirectional "me" edge between nodes can be used as an indicator to verify a user's alternate identities that are represented by a connection graph.

Another type of error that may be detected is edges erroneously marked as "me" links due to mistakes in how users or social site operators annotate social content. For example, assume that, due to a programming error, every single new article page on a news website is annotated with a "me" link to the site's main page. This would result in a connection graph showing hundreds of alternate identities for the identity of the news website, and that should signal an error since it can be safely assumed that a single user is unlikely to have that many alternate identities. The news website is not a social website in its nature, nor do these links represent true social "me" relationships, but the connection graph would represent them as such because of the incorrect annotations.

In some implementations, erroneous nodes and edges are detected either by manual inspection or by automatic detection processes that are triggered by anomalous conditions, or by a combination of both methods. In the above example, the thousands of incoming "me" links would be recognized as an anomalous link structure. Being associated with an anomalous link structure would flag a node such as the news website as possibly being an erroneous node. Detected erroneous nodes may be added to one or more exclusion lists, and the cleaning 210 may include checking the graph nodes against the exclusion lists and removing any nodes that should be disregarded.

In some implementations, cleaning 210 further may include checking the number of incoming and outgoing "me" edges of every node in the graph remaining after removal of erroneous nodes, and removing (along with their incident edges) nodes with an in-degree or an out-degree that is above a predetermined threshold. For example, assume nodes A, B, and C respectively have 90, 17, 11 incoming edges and 45, 28, 6 outgoing edges. Assume that an in-degree threshold TI is 30, and an out-degree threshold TO is 20. A and its edges will be removed because its in-degree and out-degree exceed both thresholds; B and its edges will be removed because its out-degree exceeds TO, and C will not be removed from the graph by operation of this test.

The system performs identity clustering by iteratively merging (i.e., clustering) nodes that are connected by "me" edges. Initially, a node-level connection graph is converted 215 to a cluster-level graph by assigning an ID (e.g., a numerical ID) to each node. After conversion, each node initially is viewed as a cluster of one, and a cluster node may grow in size as more and more evidence is found of identities that belong to the same user.

Conversion 215 to a cluster-level graph also includes assignment of initial weights to the "me" edges within the graph. A weight assigned to an edge corresponds to a confidence measure of the validity of the edge (e.g., how reputable the social web site operator is recognized to be, how likely it is that the link may have been added in error by a user, how likely it is that the link is outdated) and of the similarity of the user account characteristics (e.g., whether the user names of two connected accounts have partial or fully matching components, and whether two connected accounts have matching pieces of account profile and/or biographical information).

In some implementations, the initial weight of an edge is set within a [0.0, 1.0] range, and is a product of two factors: R, a value representing a degree of confidence in the reputability of the social site that provided the corresponding user data; and S, a value representing a degree of textual similarity between user names of the identities associated with the incident nodes. In some implementations, the R value may be retrieved from a list that contains confidence values for social web sites. The S value either may be set to one of a small number of values (e.g., set to 1.0 if names match and set to 0.5 if there is no match) or, alternatively, may be calculated as a function of a measure of similarity (e.g., edit distance).

Figure 3:
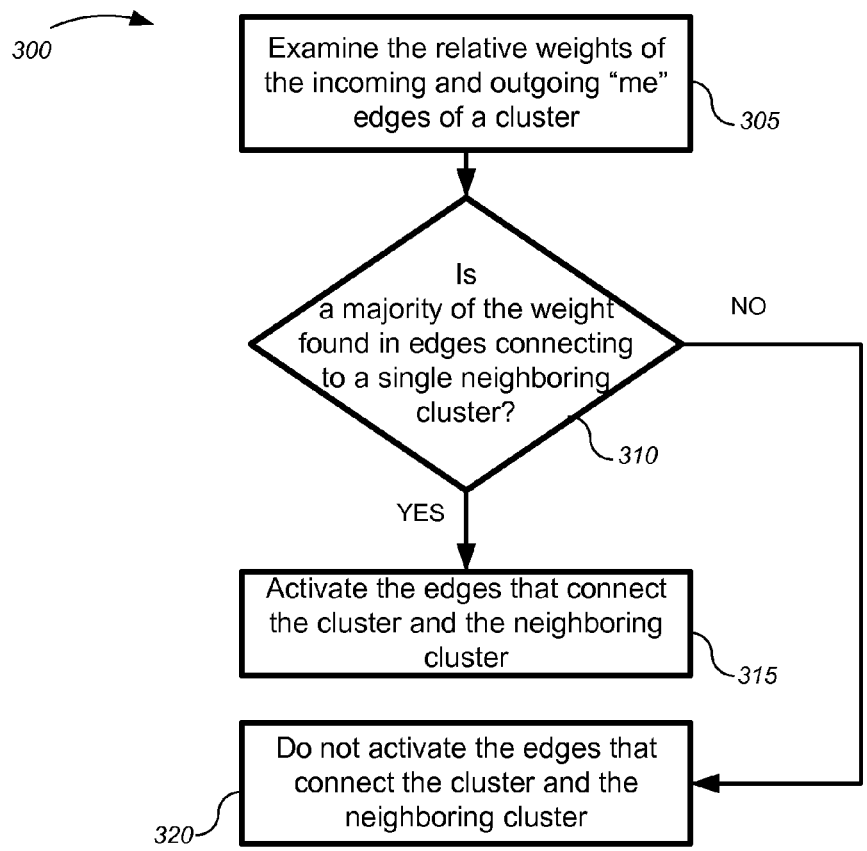
FIG. 3 is a flow diagram of an example method for deciding which "me" edges to activate.

The system examines the weighting of the "me" edges within a graph to decide 220 if edges within the graph can be activated. Initially, all "me" edges are inactive. FIG. 3 is a flow diagram of an example method 300 for deciding which "me" edges to activate. The relative weights of a cluster's incoming and outgoing "me" edges are examined 305, and if a predetermined portion of the weights are associated with edges that connect that cluster to a single neighboring cluster, the edges are activated 310. For example, if more than 90% of the total outgoing "me" edge weight of cluster #1 is over one or more edges connecting it to cluster #2, all of the outgoing edges from #1 to #2 are activated. Edges remain inactive 320 if their relative weights do not satisfy the decision criteria.

If activated edges are present 225, the nodes connected by the activated edges are merged into a cluster node 230.

Figure 4:
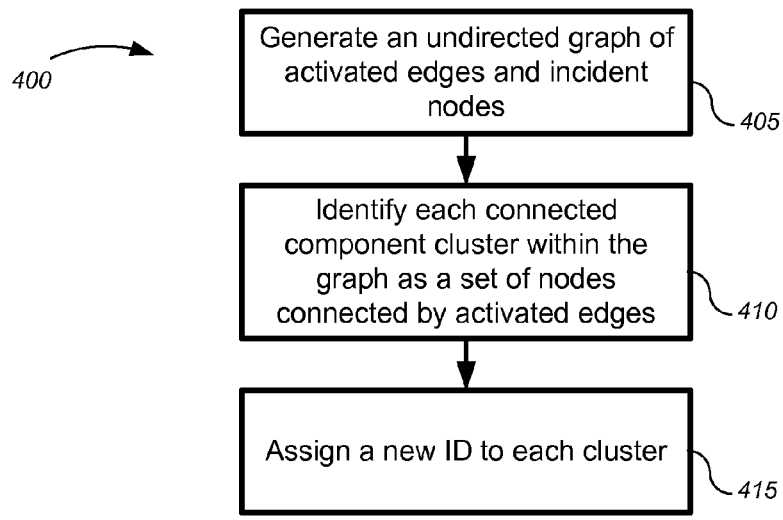
FIG. 4 is a flow diagram of an example method for grouping nodes within a connection graph into a cluster node.
Figure 5:
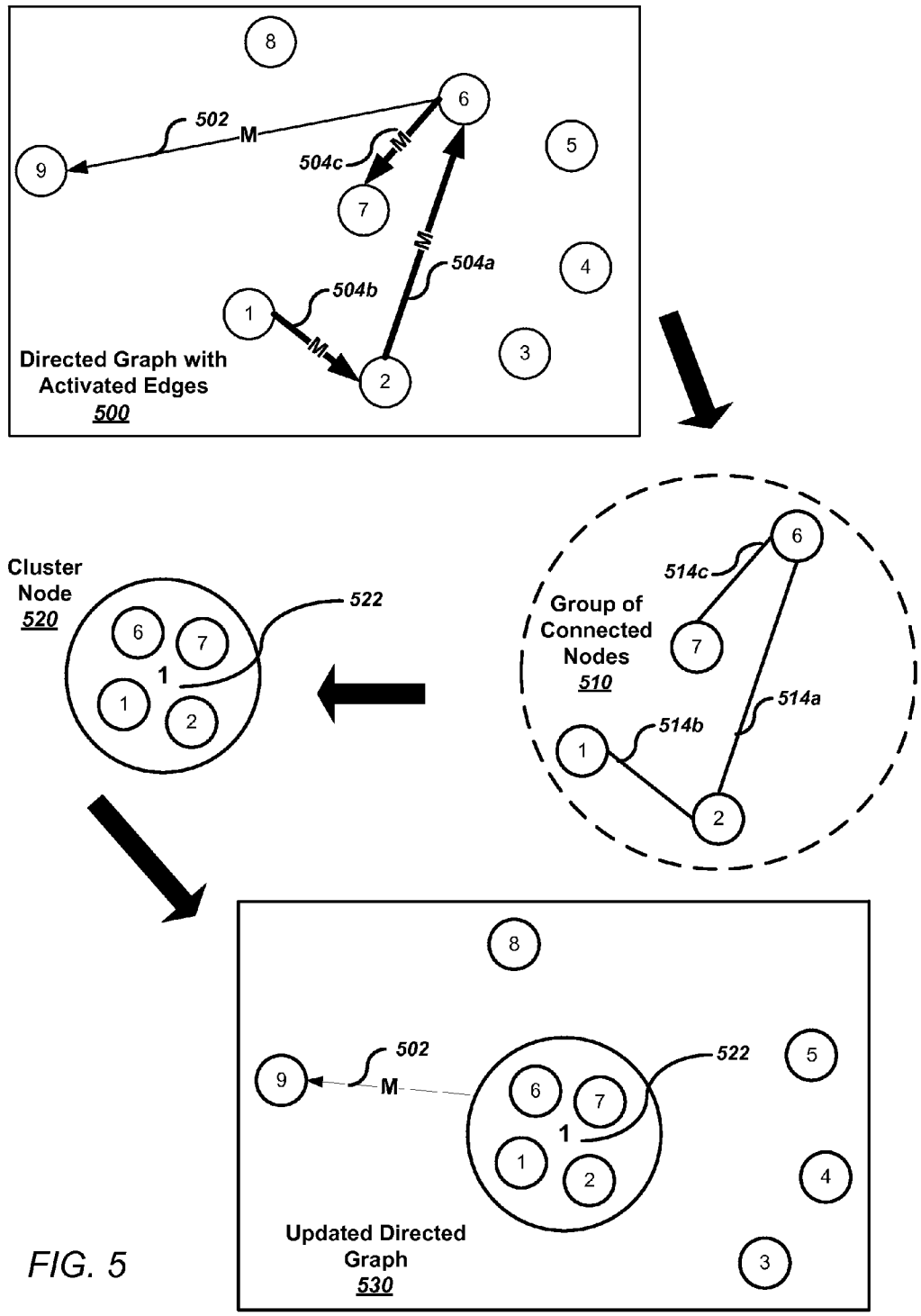
FIG. 5 is a drawing of an example scenario for generating a cluster node and updating a connection graph.

FIG. 4 is a flow diagram of an example method 400 for grouping nodes within a connection graph into a cluster node. FIG. 5 is an illustration of an example scenario for grouping nodes to form a cluster node and updating a cluster graph. Method 400 will be discussed in reference to the scenario illustrated in FIG. 5.

In FIG. 5, the directed graph 500 contains four "me" edges (502 and 504a-c). Of those "me" edges, three (504a-c) are activated: (#1, #2), (#2, #6), and (#6, #7). Edge (#6, #9) 502 was not activated because its associated weight was not greater than the predetermined threshold value.

In method 400, an undirected graph 510 of activated edges and incident nodes is generated 405 from the connection graph. A set of connected (514 *a-c*) nodes within the undirected graph 510 is identified 410 as a cluster. In the example scenario, connected nodes #1, #2, #6, and #7 are grouped into a cluster. A cluster node 520 is created and assigned 415 a new node ID (522). In some implementations, nodes are given numerical IDs and a convention for assigning a new cluster ID is to assign the cluster node the smallest numerical ID of the nodes within the cluster. In the scenario, the nodes have numerical IDs and the cluster node 520 is assigned the ID of #1, the smallest numerical ID of the nodes within the cluster.

The system updates 235 the connection graph by replacing the grouped smaller nodes with the cluster node. The edges of the cluster node become the aggregated edges of the nodes within the cluster. Each aggregated edge will be assigned a weight that is the sum of the weights of the edges it aggregates. In the updated graph 530 in the scenario, cluster node #1 has replaced nodes #1, #2, #6, and #7, and there now is a "me" edge from the cluster to node #9 replacing the (#6, #9) "me" edge in graph 500.

The system examines the weighting of the "me" edges in the updated graph 530 to decide 220 if there are any edges to activate. Thus, cluster nodes containing groups of related nodes may grow in size based on the presence of activated edges (which represent strong "me" connections) discovered within the graph. The clustering of nodes within a graph is completed when no more edges can be activated 225.

The system maintains node-to-cluster and cluster-to-node mappings, and updates these mappings as smaller nodes are grouped into larger cluster nodes. A node-to-cluster mapping associates a node with the cluster to which it belongs. A cluster-to-node mapping associates a cluster with the nodes it contains. Optionally, these mappings can provide the final output 240 of the process after clustering is complete. In some implementations, the node-to-cluster mappings and cluster-to-node mappings may be expressed as separate lists.

Identity clustering may be implemented within a distributed environment. One example distributed implementation technique is MapReduce. The term MapReduce describes both a programming model and an implementation of the model for processing and generating large data sets. Using MapReduce, programmers specify a map function that processes input (key, value) pairs to generate a set of intermediate (key, value) pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter machine communication.

Typically, several map tasks operate independently on different processors (e.g., on different computing devices) and on different portions of input data. Similarly, several reduce tasks operate independently on a portion of the intermediate data. The portions of the intermediate data are partitioned according to the intermediate keys so that the same reducer operates on all values for a given intermediate key.

An implementation of method 200 as a set of MapReduce programs is below. Each bullet point represents a separate program; there are one or more programs for each action of method 200.

Clean the Input Social Graph 210:
　Retrieve the social graph of nodes and connecting "me" edges (represented as node adjacency lists) from a source data store.
　From the graph, remove edges with at least one incident node that appears on the exclusion list.
　From the graph, remove isolated nodes (without incoming or outgoing edges) and nodes with an in- or out-degree above a respective in- or out-threshold.

Assign Initial Cluster IDs to Nodes, Convert the Node-Level Graph to the Initial Cluster-Level Graph 215:
　Using the graph, generate a list NC of initial node-to-cluster mappings.
　Using the initial node-to-cluster mappings, generate initial (trivial) cluster-to-node mappings (with each cluster consisting of one node only) (list CN).
　Using the graph and the node-to-cluster mappings, generate a new graph G with nodes replaced by cluster IDs.

Decide if any Edges can be Activated in the Cluster-Level Graph 220:
　Using the graph G, generate a list AE of active edges by checking the in- and out-weights of cluster edges, and identifying and activating edges above weight thresholds.

Compute the Connected Components of the Undirected Graph of Activated Edges 230:
　Using the list AE of active edges, generate undirected graph U for connected component computation.
　Using the undirected graph U, output each cluster's current ID to all its neighbors. Then compute each cluster's new ID as the minimum of its current cluster ID and the received cluster IDs; and generate a list CU of current cluster ID to new cluster ID mappings.
　In the event that some new cluster ID differs from current one: Update NC by replacing current cluster IDs with new ones.
　In the event that some new cluster ID differs from current one: Using the current-to-new cluster ID mappings CU, update the undirected graph U by collapsing (smaller) old clusters into (larger) new ones. Go back to repeatedly executing the previous two MapReduce steps using the updated graph.

Collapse the Cluster-Level Graph to Correspond to the New Clusters 235:
　Using NC, update CN.
　Using NC, start updating G by replacing old clusters IDs by new ones.
　Finish updating G by merging separate adjacency lists, for old clusters that were collapsed, into a single one, for the corresponding new cluster.

Produce Final Output of Node-to-Cluster and Cluster-to-Nodes Mapping 240:
　Write NC to the destination data store.
　Write CN to the destination data store.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed using one or more processors, the method comprising:
   receiving, by the one or more processors, a connection graph representing public social data comprising identity data and social link data, wherein the connection graph comprises nodes and directed edges, each edge connecting a pair of nodes, wherein each node represents an identity extracted from the public social data and each edge represents a social link extracted from the public social data from one identity to another different identity, wherein each node represents a distinct identity, and wherein each edge is a "me" edge if the edge represents a "me" social link between identities claimed by a link author as belonging to the same person or real-life entity, and a "friend" edge represents a "friend" social link between identities claimed by a link author as belonging to different persons or entities;
   converting, at the one or more processors, the connection graph to a cluster graph, the cluster graph comprising clusters and cluster edges, each edge connecting a pair of clusters, each cluster corresponding to one or more nodes of the connection graph, and each edge of the cluster graph corresponding to one or more edges of the connection graph, wherein each cluster of the cluster graph initially corresponds to a single node of the connection graph and each edge of the cluster graph initially corresponds to a single edge of the connection graph; and
   clustering, at the one or more processors, identities by iteratively performing the following actions (i) and (ii) until no pair of clusters exists in the cluster graph that satisfies the threshold fraction condition of action (ii):
   (i) identifying all outgoing "me" edges from a first cluster and all "me" edges to a second cluster, wherein each "me" edge has a respective weight; and
   (ii) determining that the weights of all "me" edges from the first cluster to the second cluster are more than a threshold fraction of the weights of all outgoing "me" edges from the first cluster and as a consequence merging the first cluster and the second cluster to form a new cluster replacing the first and second clusters, wherein the edges of the new cluster node are aggregations of the edges of the former first cluster and the edges of the former second cluster, and wherein the new cluster represents the identities of the former first cluster and the identities of the former second cluster.

2. The method of claim 1, further comprising assigning weights to "me" edges, wherein a weight assigned to a "me" edge from a first node to a second node is determined from a reputation value assigned to the first node and a measure of textual similarity between a user name associated with the identity represented by the first node and a user name associated with the identity represented by the second node.

3. The method of claim 2, wherein the measure of textual similarity is one of two or more predetermined values.

4. The method of claim 2, wherein the measure of textual similarity is computed by applying a comparison function.

5. The method of claim 4 wherein the comparison function is an edit distance function.

6. The method of claim 1 wherein the "me" edges connecting the first cluster and the second cluster are replaced with a single replacement "me" edge, and the replacement "me" edge weight is a sum of the weights of the replaced "me" edges.

7. The method of claim 1, further comprising:
   cleaning the connection graph by removing erroneous nodes and edges before converting the connection graph to the cluster graph.

8. The method of claim 7, wherein cleaning the connection graph comprises:
   removing a node from the connection graph because the node is on an exclusion list from the connection graph.

9. The method of claim 7, wherein cleaning the connection graph further comprises:
   removing a node and the "me" edges of the node from the connection graph because a total number of incoming "me" edges to the node exceeds an in-degree threshold value or a total number of outgoing "me" edges from the node exceeds an out-degree threshold value.

10. A non-transitory computer storage medium encoded with a computer program, the program comprising instructions that when executed by one or more computers cause the one or more computers to perform operations comprising:
   receiving a connection graph representing public social data comprising identity data and social link data, wherein the connection graph comprises nodes and directed edges, each edge connecting a pair of nodes, wherein each node represents an identity extracted from the public social data and each edge represents a social link extracted from the public social data from one identity to another different identity, wherein each node represents a distinct identity, and wherein each edge is a "me" edge if the edge represents a "me" social link between identities claimed by a link author as belonging to the same person or real-life entity, and a "friend" edge represents a "friend" social link between identities claimed by a link author as belonging to different persons or entities;

converting the connection graph to a cluster graph, the cluster graph comprising clusters and cluster edges, each edge connecting a pair of clusters, each cluster corresponding to one or more nodes of the connection graph, and each edge of the cluster graph corresponding to one or more edges of the connection graph, wherein each cluster of the cluster graph initially corresponds to a single node of the connection graph and each edge of the cluster graph initially corresponds to a single edge of the connection graph; and clustering identities by iteratively performing the following actions (i) and (ii) until no pair of clusters exists in the cluster graph that satisfies the threshold fraction condition of action (ii):
(i) identifying all outgoing "me" edges from a first cluster and all "me" edges to a second cluster, wherein each "me" edge has a respective weight; and
(ii) determining that the weights of all "me" edges from the first cluster to the second cluster are more than a threshold fraction of the weights of all outgoing "me" edges from the first cluster and as a consequence merging the first cluster and the second cluster to form a new cluster replacing the first and second clusters, wherein the edges of the new cluster node are aggregations of the edges of the former first cluster and the edges of the former second cluster, and wherein the new cluster represents the identities of the former first cluster and the edges of the former second cluster.

11. A system comprising:
one or more computers and one or more storage devices storing instructions that when executed by the one or more computers cause the one or more computers to perform operations comprising:
receiving a connection graph representing public social data comprising identity data and social link data, wherein the connection graph comprises nodes and directed edges, each edge connecting a pair of nodes, wherein each node represents an identity extracted from the public social data and each edge represents a social link extracted from the public social data from one identity to another different identity, wherein each node represents a distinct identity, and wherein each edge is a "me" edge if the edge represents a "me" social link between identities claimed by a link author as belonging to the same person or real-life entity, and a "friend" edge represents a "friend" social link between identities claimed by a link author as belonging to different persons or entities;
converting the connection graph to a cluster graph, the cluster graph comprising clusters and cluster edges, each edge connecting a pair of clusters, each cluster corresponding to one or more nodes of the connection graph, and each edge of the cluster graph corresponding to one or more edges of the connection graph, wherein each cluster of the cluster graph initially corresponds to a single node of the connection graph and each edge of the cluster graph initially corresponds to a single edge of the connection graph; and clustering identities by iteratively performing the following actions (i) and (ii) until no pair of clusters exists in the cluster graph that satisfies the threshold fraction condition of action (ii):
(i) identifying all outgoing "me" edges from a first cluster and all "me" edges to a second cluster, wherein each "me" edge has a respective weight; and
(ii) determining that the weights of all "me" edges from the first cluster to the second cluster are more than a threshold fraction of the weights of all outgoing "me" edges from the first cluster and as a consequence merging the first cluster and the second cluster to form a new cluster replacing the first and second clusters, wherein the edges of the new cluster node are aggregations of the edges of the former first cluster and the edges of the former second cluster, and wherein the new cluster represents the identities of the former first cluster and the edges of the former second cluster.

12. The system of claim 11, wherein the operations further comprise assigning weights to "me" edges, wherein a weight assigned to a "me" edge from a first node to a second node is determined from a reputation value assigned to the first node and a measure of textual similarity between a user name associated with the identity represented by the first node and a user name associated with the identity represented by the second node.

13. The system of claim 12, wherein the measure of textual similarity is one of two or more predetermined values.

14. The system of claim 12, wherein the measure of textual similarity is computed by applying a comparison function.

15. The system of claim 14, wherein the comparison function is an edit distance function.

16. The system of claim 11, wherein the "me" edges connecting the first cluster and the second cluster are replaced with a single replacement "me" edge, and the replacement "me" edge weight is a sum of the weights of the replaced "me" edges.

17. The system of claim 11, wherein the operations further comprise:
cleaning the connection graph by removing erroneous nodes and edges before converting the connection graph to the cluster graph.

18. The system of claim 17, wherein cleaning the connection graph comprises:
removing a node from the connection graph because the node is on an exclusion list from the connection graph.

19. The system of claim 17, wherein cleaning the connection graph further comprises:
removing a node and the "me" edges of the node from the connection graph because a total number of incoming "me" edges to the node exceeds an in-degree threshold value or a total number of outgoing "me" edges from the node exceeds an out-degree threshold value.

* * * * *